US008146414B2

(12) United States Patent  
Evans et al.

(10) Patent No.: US 8,146,414 B2  
(45) Date of Patent: Apr. 3, 2012

(54) MATERIAL WITHDRAWAL APPARATUS AND METHODS OF REGULATING MATERIAL INVENTORY IN ONE OR MORE UNITS

(75) Inventors: Martin Evans, Tolland, CT (US); Ronald Butterfield, Jackson, NJ (US); Charles Radcliffe, Cumbria (GB)

(73) Assignee: Intercat Equipment, Inc., Sea Girt, NJ (US)

( * ) Notice: Subject to any disclaimer, the term of this patent is extended or adjusted under 35 U.S.C. 154(b) by 108 days.

(21) Appl. No.: 12/553,358

(22) Filed: Sep. 3, 2009

(65) Prior Publication Data

US 2010/0058879 A1 Mar. 11, 2010

Related U.S. Application Data

(60) Provisional application No. 61/094,650, filed on Sep. 5, 2008.

(51) Int. Cl.
*G01F 17/00* (2006.01)
(52) U.S. Cl. .......................................... 73/149
(58) Field of Classification Search ...................... 73/149
See application file for complete search history.

(56) References Cited

U.S. PATENT DOCUMENTS

| 2,616,591 | A | 11/1952 | Haugen |
| 3,009,588 | A | 11/1961 | Mitchell |
| 3,212,657 | A | 10/1965 | Murfitt et al. |
| 3,850,582 | A | 11/1974 | Luckenbach |
| 3,860,510 | A | 1/1975 | Henke et al. |
| 3,893,905 | A | 7/1975 | Fenske et al. |
| 4,082,513 | A | 4/1978 | Andon et al. |
| 4,327,055 | A | 4/1982 | Luckenbach et al. |
| 4,434,245 | A | 2/1984 | Lomas et al. |

(Continued)

FOREIGN PATENT DOCUMENTS

EP 0236609 A1 9/1987

(Continued)

OTHER PUBLICATIONS

Sadik Kakac, Hongtan Liu, "Heat Exchangers: selection, rating, and thermal design", 2002, CRC press LLC, 2nd Edition, pp. 73, 224.*

(Continued)

*Primary Examiner* — Lisa Caputo  
*Assistant Examiner* — Jamel Williams  
(74) *Attorney, Agent, or Firm* — Kevin M. Carroll; Patterson & Sheridan, LLP

(57) ABSTRACT

Material withdrawal apparatus and methods and systems of regulating material inventory in one or more units are provided. A material withdrawal apparatus includes a heat exchanger and a sensor. The heat exchanger includes a material inlet, material outlet, cooling fluid inlet, and cooling fluid outlet. The material inlet is coupled to the unit and the sensor is coupled to the heat exchanger to provide a metric indicative of the temperature at the material inlet; material outlet; cooling fluid inlet and cooling fluid outlet. Another embodiment of a material withdrawal apparatus includes a vessel having an outer wall, liner, fill port, and a discharge port. The liner at least partially covers the inner surface of the outer wall. The fill port and discharge port are defined in the vessel and the fill port is configured to receive withdrawn material from at least a unit. Other embodiments provide methods of withdrawing or regulating material in a unit.

8 Claims, 6 Drawing Sheets

U.S. PATENT DOCUMENTS

| | | |
|---|---|---|
| 4,660,881 A | 4/1987 | Komeya et al. |
| 4,769,127 A | 9/1988 | Erickson et al. |
| 4,782,427 A | 11/1988 | Marks |
| 4,809,883 A | 3/1989 | Pozo |
| 4,809,889 A | 3/1989 | Friedman |
| 4,840,726 A | 6/1989 | Wakefield, Jr. |
| 4,888,156 A | 12/1989 | Johnson |
| 5,055,176 A | 10/1991 | Herbst et al. |
| 5,064,099 A | 11/1991 | Iwako |
| 5,190,635 A | 3/1993 | Hettinger |
| 5,286,370 A | 2/1994 | Chu et al. |
| 5,339,236 A | 8/1994 | Tamagawa |
| 5,389,236 A | 2/1995 | Bartholic et al. |
| 5,401,387 A | 3/1995 | Harandi et al. |
| 5,464,591 A | 11/1995 | Bartholic |
| 5,496,525 A | 3/1996 | Lietz et al. |
| 5,810,045 A | 9/1998 | Evans |
| 6,132,157 A | 10/2000 | Comardo |
| 6,358,401 B1 | 3/2002 | Evans |
| 6,859,759 B2 | 2/2005 | Evans |
| 6,878,656 B2 | 4/2005 | Bartholic |
| 6,974,559 B2 | 12/2005 | Evans |
| 7,050,944 B2 | 5/2006 | Evans |
| 7,223,714 B2 | 5/2007 | Beech, Jr. et al. |
| 7,364,708 B2 | 4/2008 | Evans |
| 7,390,396 B2 | 6/2008 | Evans |
| 7,431,894 B2 | 10/2008 | Evans |
| 7,438,863 B2 | 10/2008 | Evans |
| 7,510,647 B2 | 3/2009 | Evans |
| 7,622,600 B1 | 11/2009 | Marr |
| 7,842,250 B2 | 11/2010 | Evans |
| 7,846,399 B2 | 12/2010 | Albin |
| 2001/0041117 A1 | 11/2001 | Comardo |
| 2003/0127358 A1 | 7/2003 | Letzsch |
| 2004/0099572 A1 | 5/2004 | Evans |
| 2004/0102929 A1 | 5/2004 | Evans |
| 2004/0117158 A1 | 6/2004 | Evans |
| 2004/0166032 A1 | 8/2004 | Evans |
| 2005/0029163 A1 | 2/2005 | Letzsch |
| 2005/0103684 A1 | 5/2005 | Evans |
| 2005/0106079 A1 | 5/2005 | Evans |
| 2006/0074571 A1 | 4/2006 | Evans |
| 2006/0138028 A1 | 6/2006 | Evans |
| 2006/0147358 A1 | 7/2006 | Evans |
| 2006/0236595 A1 | 10/2006 | Nakamura |
| 2007/0020154 A1 * | 1/2007 | Evans ............... 422/139 |
| 2007/0130822 A1 | 6/2007 | Araya |
| 2007/0204506 A1 | 9/2007 | Brenes |
| 2008/0029432 A1 | 2/2008 | Elliott et al. |
| 2009/0110608 A1 | 4/2009 | Vierheilig et al. |
| 2009/0115434 A1 | 5/2009 | Hirthe et al. |
| 2009/0115436 A1 | 5/2009 | Koehler, III et al. |
| 2009/0131711 A1 | 5/2009 | Wanasundara |
| 2009/0183422 A1 | 7/2009 | Wysong |
| 2009/0291469 A1 | 11/2009 | David |
| 2010/0189706 A1 | 7/2010 | Chang et al. |
| 2010/0230324 A1 | 9/2010 | Al-Alloush et al. |
| 2010/0317749 A1 | 12/2010 | Kukkonen et al. |
| 2010/0317905 A1 | 12/2010 | Kukkonen et al. |
| 2010/0319424 A1 | 12/2010 | Wietgrefe |

FOREIGN PATENT DOCUMENTS

| | | |
|---|---|---|
| JP | 63 294934 A | 12/1988 |
| JP | 05-085853 A | 4/1993 |
| JP | 2002-519302 T | 7/2002 |
| JP | 2008104355 A | 5/2008 |
| JP | 2008-180437 A | 8/2008 |
| KR | 2007-0100877 | 10/2007 |
| WO | WO-2008032094 A1 | 3/2008 |

OTHER PUBLICATIONS

T Kuppan, "Heat Exchangers design handbook", 2000, Marcel Dekker, Inc. pp. 30, 833.*

PCT international search report and written opinion of PCT/US2009/055940 dated Jan. 31, 2011.

PCT Search report and written opinion of PCT US2009/069397 dated Aug. 19, 2010.

"IMS to Control Room", Dwg S-29, Sheet 1, Savannah, Georgia, Nov. 26, 2001.

Everlasting Valve Company, www.everlastingvalveco.com, printed Feb. 6, 2003.

PCT Search report and written opinion of PCT US2009/051958 dated Mar. 17, 2010.

European Search Report for PCT/US2006027542 dated Oct. 29, 2009.

PCT Search report and written opinion of PCT US2006/027542 dated Jan. 22, 2008.

PCT Search report and written opinion of PCT US2009/055940 dated Jan. 31, 2011.

* cited by examiner

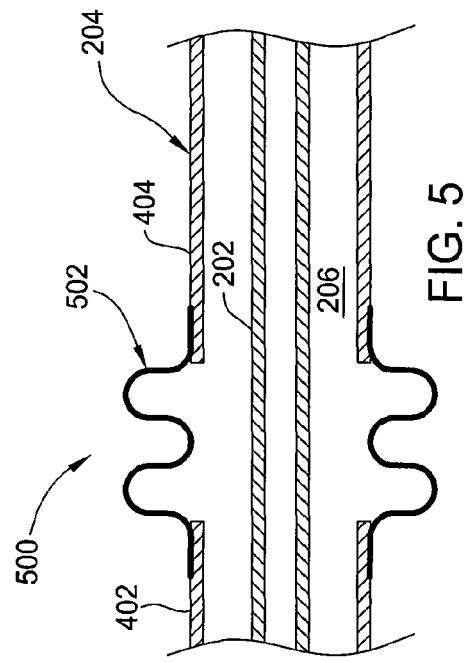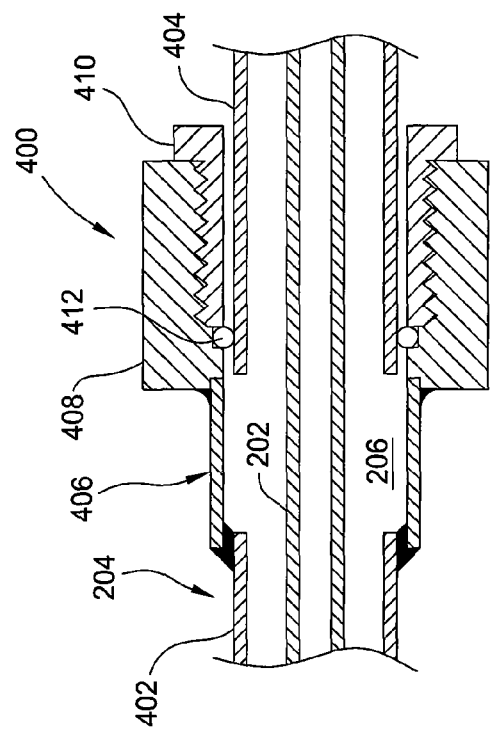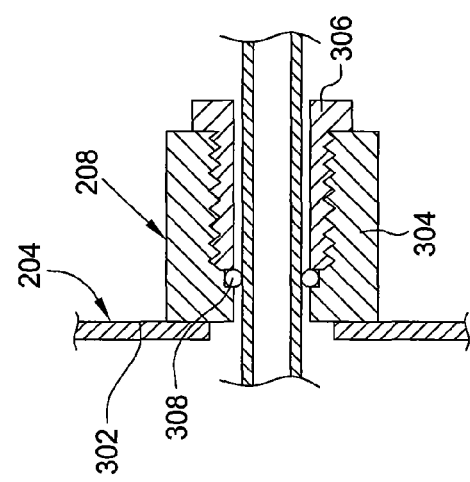

MATERIAL WITHDRAWAL APPARATUS AND METHODS OF REGULATING MATERIAL INVENTORY IN ONE OR MORE UNITS

CROSS-REFERENCE TO RELATED APPLICATIONS

This application claims priority to provisional application 61/094,650 filed Sep. 5, 2008 titled MATERIAL WITHDRAWAL APPARATUS AND METHODS OF REGULATING MATERIAL INVENTORY IN ONE OR MORE UNITS.

BACKGROUND OF THE INVENTION

1. Field of the Invention

Embodiments of the invention generally relate to a material withdrawal apparatus and method of such. Particularly, the invention relates to material withdrawal apparatus and methods of metering and withdrawing one or more materials from one or more fluid catalytic cracking (FCC) unit and one or more non-FCC units such as manufacture of acrylonitrile, as manufacture of pyridine and its derivatives, and other industrial processes, etc.

2. Description of the Related Art

FIG. 1 is a simplified schematic of a conventional fluid catalytic cracking system 130. The fluid catalytic cracking system 130 generally includes a fluid catalytic cracking (FCC) unit 110 coupled to a catalyst injection system 100, a petroleum feed stock source 104, an exhaust system 114 and a distillation system 116.

The FCC unit 110 includes a regenerator 150 and a reactor 152. The reactor 152 primarily houses the catalytic cracking reaction of the petroleum feed stock and delivers the cracked product in vapor form to the distillation system 116. Spend catalyst from the cracking reaction is transfer from the reactor 152 to the regenerator 150 to regenerate the catalyst by removing coke and other materials. The rejuvenated catalyst is reintroduced into the reactor 152 to continue the petroleum cracking process to burn off coke from the catalyst. The regenerated catalyst is then reintroduced into the reactor 152 to continue the petroleum cracking process.

The fluid catalytic cracking system generally includes a FCC unit coupled to a catalyst injection system 100 that maintains a continuous or semi continuous addition of fresh catalyst to the inventory circulating between a regenerator and a reactor.

During the catalytic process, there is a dynamic balance of the total catalyst within the FCC unit. For example, catalyst is periodically added utilizing the catalyst injection system and some catalyst is lost in various ways such as through the distillation system, through the effluent exiting the regenerator, etc.

If the amount of catalyst within the FCC unit diminishes over time, the performance and desired output of the FCC unit will diminish, and the FCC unit will become inoperable. Conversely, if the catalyst inventory in the FCC unit increases over time or becomes deactivated, the catalyst bed level within the regenerator reaches an upper operating limit and the deactivated or excess catalyst is withdrawal to prevent unacceptably high catalyst emissions into the flue gas stream, or other process upsets.

Thus, there is a need for a material withdrawal apparatus suitable for withdrawing materials from one or more units, like FCC units.

BRIEF DESCRIPTION

The purpose and advantages of embodiments of the invention will be set forth and apparent from the description of exemplary embodiments that follows, as well as will be learned by practice of the embodiments of the invention. Additional advantages will be realized and attained by the methods and systems particularly pointed out in the written description and claims hereof, as well as from the appended drawings.

An embodiment of the invention provides a material withdrawal apparatus. The material withdrawal apparatus includes a heat exchanger and a sensor. The heat exchanger includes a material inlet, material outlet, cooling fluid inlet, and cooling fluid outlet. The material inlet is coupled to at least a unit and the sensor is coupled to the heat exchanger to provide a metric indicative of the temperature at the material inlet; material outlet; cooling fluid inlet and cooling fluid outlet.

A second embodiment of the invention provides a material withdrawal apparatus having a vessel suitable for high temperature operation. The vessel includes an outer wall, a liner, a fill port and a discharge port. The liner comprises a heat insulating refractory material. The liner at least partially covers the inner surface of the outer wall and the liner comprising a heat insulating refractory material. The fill port and discharge port are defined in the vessel and the fill port is configured to receive withdrawn material from at least a unit.

A third embodiment provides a method. The method includes: withdrawing material from a unit to a heat exchanger coupled to the unit; wherein the heat exchanger has a material inlet; a material outlet; a cooling fluid inlet and a cooling fluid outlet with respective temperatures; measuring the respective temperatures at the material inlet; material outlet; cooling fluid inlet and cooling fluid outlet of the heat exchanger; determining a change in temperature between the material inlet and material outlet and determining a change in temperature between the cooling fluid inlet and cooling fluid outlet; and correlating the change in temperature between the material inlet and material outlet and the change in temperature between the cooling fluid inlet and cooling fluid outlet to a metric of material withdrawn from the unit.

A fourth embodiment provides a method. The method includes: withdrawing material from a unit into vessel coupled to at least a unit; and measuring the metric of material withdrawn into the vessel. The vessel includes an outer wall, a liner, a fill port and a discharge port. The liner comprises a heat insulating refractory material. The liner at least partially covers the inner surface of the outer wall and the liner comprising a heat insulating refractory material. The fill port and discharge port are defined in the vessel and the fill port is configured to receive withdrawn material from at least a unit.

A fifth embodiment provides a system. The system includes a unit coupled to a material withdrawal apparatus. Material withdrawal apparatus includes at least a member selected from a group consisting of heat exchanger, a vessel, and combinations thereof. The heat exchanger includes a material inlet, material outlet, cooling fluid inlet, and cooling fluid outlet. The material inlet is coupled to at least a unit and the sensor is coupled to the heat exchanger to provide a metric indicative of the temperature at the material inlet; material outlet; cooling fluid inlet and cooling fluid outlet. The vessel includes an outer wall, a liner, a fill port and a discharge port. The liner comprises a heat insulating refractory material. The liner at least partially covers the inner surface of the outer wall and the liner comprising a heat insulating refractory material. The fill port and discharge port are defined in the vessel and the fill port is configured to receive withdrawn material from at least a unit.

DESCRIPTION OF THE DRAWINGS

The accompanying figures, which are incorporated in and constitute part of this specification, are included to illustrate and provide a further understanding of the method and system of the invention. Together with the description, the drawings serve to explain the principles of the invention.

FIG. 3 is schematic diagram detailing a heat exchanger in accordance with an embodiment of the present invention;

FIG. 4 is another schematic diagram of a heat exchanger with a seal in accordance with an embodiment of the present invention;

FIG. 5 is another schematic diagram of a heat exchanger with a seal in accordance with an embodiment of the present invention;

DETAILED DESCRIPTION

Figure 1:
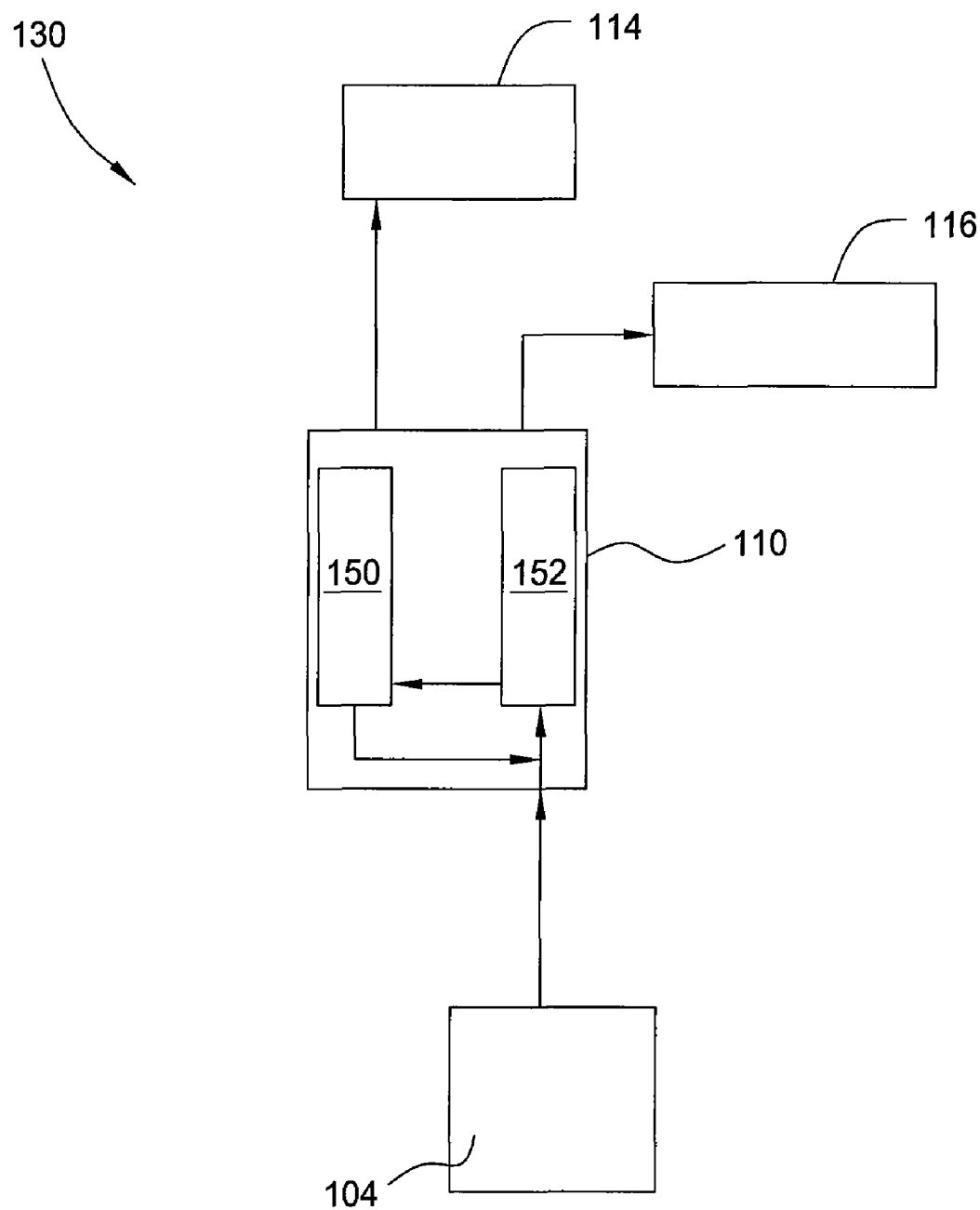
FIG. 1 is a schematic diagram of a conventional material withdrawal apparatus in accordance with an embodiment of the present invention.

In the following description, like reference characters designate like or corresponding parts throughout the several views shown in the figures. It is also understood that terms such as "top," "bottom," "outward," "inward," and the like are words of convenience and are not to be construed as limiting terms.

Reference will now be made in detail to exemplary embodiments of the invention which are illustrated in the accompanying figures and examples. Referring to the drawings in general, it will be understood that the illustrations are for describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group. Furthermore, when any variable occurs more than one time in any constituent or in formula, its definition on each occurrence is independent of its definition at every other occurrence. Also, combinations of substituents and/or variables are permissible only if such combinations result in stable compounds.

Figure 2:
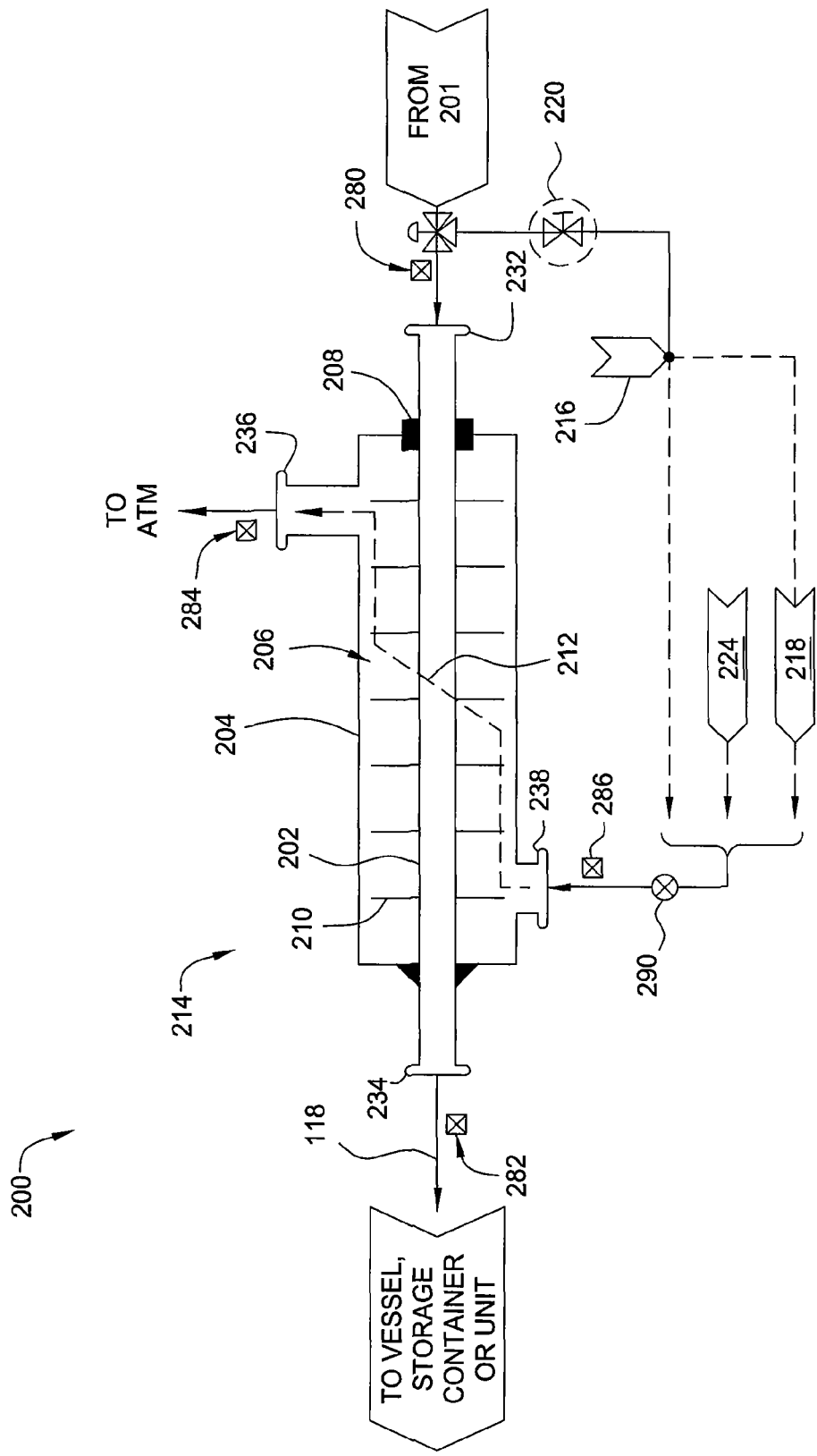
FIG. 2 is a schematic diagram of a material withdrawal apparatus in accordance with an embodiment of the present invention.

FIG. 2 is a schematic representation of an embodiment of a material withdrawal system 200 for removing one or more types of materials from one or more units 201. The material withdrawal apparatus includes a heat exchanger 214 and one or more sensors 280, 282, 284, 286 and 290. The heat exchanger 214 includes one or more material inlets 232, one or more material outlets 234, one or more cooling fluid outlets 236, and one or more cooling fluid inlets to 238. The material inlet coupled to at least a unit 201 so that material from the unit 201 may be passed through the heat exchanger 214 and cooled prior to exiting the heat exchanger 214 through the material outlet 234. The material passing through the heat exchanger 214 is cooled by a cooling fluid entering the heat exchanger 214 through the cooling fluid inlet 232 and exiting the heat exchanger 214 through the cooling fluid outlet 234.

In one embodiment, heat exchanger 214 includes a plurality of sensors such as one or more material inlet temperature sensors 280, one or more material outlet temperature sensors 282, one or more cooling fluid outlet temperature sensors 284, and one or more cooling fluid inlet temperature sensor 286 to respectively provide metrics indicative of the temperatures at the material inlet 232, material outlet 234, cooling fluid inlet 238, and cooling fluid outlet 236. The temperature at the material inlet 232 is indicative of the temperature of the material entering the heat exchanger 214 from the unit 201. The temperature at the material outlet 234 is indicative of the temperature of the material exiting the heat exchanger 214. The temperature at the cooling fluid inlet 238 is indicative of the temperature of cooling fluid entering the heat exchanger 214 while temperature at the cooling fluid outlet 236 is indicative of the temperature of cooling fluid exiting the heat exchanger 214. Non-limiting examples of temperature sensors, for illustration and not limitation, include Thermocouples, Pt Resistance Thermometers, and IR cameras, either individually or in a combination of two or more thereof. Pt Resistance Thermometers measure temperature based on changes in electrical resistance of Platinum (Pt) at different temperatures. IR cameras use the measurement of infrared light emissions to measure the temperature of an object. In one embodiment, cooling fluid outlet to 236 and the material inlet 232 are located at one end of the heat exchanger 214 while the cooling fluid inlet 238 and the material outlet 234 are located at the opposite end of the heat exchanger 214.

The sensor 290 is configured to provide a metric indicative of the amount of cooling fluid passing through the heat exchanger 214. The sensor 290 may be interfaced with at least one of the conduits coupled to the cooling fluid outlet 236 or the cooling fluid inlet 238. Alternatively, the sensor 290 may be interfaced with the heat exchanger 214 to determine the amount of cooling fluid passing through the heat exchanger 214. In the embodiment depicted in FIG. 2, the sensor 290 is a flow meter interfaced with the conduit supplying cooling fluid to the cooling fluid inlet 238.

The mass or quantity of withdrawn materials from the unit 201 may be derived using the temperature information obtained from the withdrawn material and cooling fluid passing through the heat exchanger 214 using a heat balance model. In one embodiment, since the mass or quantity of withdrawn material from the unit is measured by a heat balance around the heat exchanger system, a separate weight measuring vessel or other equipment for determining the amount of material withdrawn from the unit 201 is not required such that the material withdrawal system 200 is substantially free of a vessel utilized for measuring material (i.e., a metering vessel). In another embodiment, a withdrawn material flows from a unit 201 through the heat exchanger 214 and then through a delivery line 118 which connects the heat exchanger 214 to a vessel. The vessel may be a simple storage or shipping container, or a metering vessel which can be used for redundancy or calibration of the heat balance. Thus, in one embodiment, the delivery line 118 delivers withdrawn cooled material from the heat exchanger to the vessel. It should be appreciated that the material withdrawal apparatus 200 may be used in units or processes which have varying degree of specificity in metered the amount of withdrawn material. Thus, depending upon the specificity of calculating the amount of withdrawn material, the mass or quantity of withdrawn material from the unit (i.e. the catalyst cooled and transferred to the spent catalyst hopper) may be calculated by a heat balance around the heat exchanger system by the use of the following equation, with or without a metering vessel:

Mass of cooling fluid×Specific Heat of cooling fluid×(temperature of cooling fluid at cooling fluid outlet−temperature of cooling fluid at cooling fluid inlet)=Mass of material× Specific heat of material×(temperature of material at material inlet−temperature of material at material inlet); wherein temperature of cooling fluid at the cooling fluid outlet may be derived from information from the sensor 284, wherein temperature of cooling fluid at the cooling fluid inlet may be derived from information from the sensor 286, wherein temperature of material at the material outlet may be derived from information from the sensor 282, wherein temperature of material at the material inlet may be derived from information from the sensor 280. In one embodiment, the material is catalyst or other material withdrawn from unit 201. In one embodiment, the cooling fluid is air or other suitable cooling fluid. The mass of cooling fluid may be derived from information obtained from the sensor 290. It is contemplated that the a metric of the amount of material being passed through a heat exchanger may be determined using the heat balance described above utilizing heat exchangers of other types and/or having other configurations.

In one embodiment, the heat exchanger 214 includes a first conduit 202 and a housing 204. Material (i.e. catalyst) flows from the unit 201 via the conduit 202 and a coolant is circulated through the coolant volume 206 defined between the first conduit 202 and the housing 204 to extract heat from the material in the first conduit 202. In one embodiment, the first conduit 202 of the heat exchanger 214 is substantially non-tortuous and substantially free of bends or curves. It should be noted that some bends or curves may exist. In one embodiment, the first conduit 202 is substantially non-tortuous and free of bends or curves to an amount of less than about 10% by surface area. In another embodiment, the first conduit 202 is substantially non-tortuous and free of bends or curves to an amount of less than about 5% by surface area. In a particular embodiment, the first conduit 202 is substantially non-tortuous and free of bends or curves to an amount of less than about 1% by surface area. In one embodiment, the first conduit 202 of the heat exchanger is substantially linear. In a particular embodiment, first conduit 202 is substantially linear up to about 99%, up to about 95%, up to about 90%, up to about 85%, up to about 80%, and up to about 75%.

"Substantially free" of bends or 'substantially linear' expressly allows the presence of trace amounts on non-linear surfaces and is not to be limited to a specified precise value, and may include values that differ from the specified value. In one embodiment, "substantially free" expressly allows the presence of trace amounts of non-linear surfaces. In a particular embodiment, "substantially free" expressly allows the presence of trace amounts of non-linear circumference, area, or volume, in respectively continuous or discrete fashion, such that the total circumference, area, or volume of a first conduit 202 is substantially non-tortuous and free of bends or curves by less than about 10%, by less than about 5%, by less than about 1%, by less than about 0.5%, and less than about 0.1%. "Substantially free" expressly allows the presence of the respective trace amounts of non-linear surfaces, etc. but does not require the presence non-linear surfaces, such as bends or curves.

Approximating language, as used herein throughout the specification and claims, may be applied to modify any quantitative or qualitative representation that could permissibly vary without resulting in a change in the basic function to which it is related. Accordingly, a value modified by a term such as "less than about" or "substantially free of" is not to be limited to a specified precise value, and may include values that differ from the specified value. In at least some instances, the approximating language may correspond to the precision of an instrument for measuring the value. Furthermore, "withdrawal of material" may be used in combination with a term, and include a varying amount of withdrawn material and is not to be limited to a specified precise value, and may include values that differ from a specified value.

In one embodiment of the heat exchanger 214, the housing 204 includes a tube maintained at a spaced apart relation from the first conduit 202. The shape and size of the housing may vary and is adjustable based on intended use. The first conduit 202 includes one or more protrusions 210 to hold the first conduit in spaced apart relation relative to the housing. In one embodiment, the protrusion 210 is unattached to the housing 204 to allow the longitudinal expansion of the conduit 202 relative to the housing 204. In one embodiment, the heat exchanger 214 includes a first conduit 202 and a housing 204 wherein the housing 204 wraps around the first conduit 202 like a helix.

The shape and size of the protrusions 210 or housing 204 may vary. For illustration and not limitation, the protrusions 210 may be in the shape of a sphere, fiber, plate, cube, tripod, pyramid, rod, tetrapod, fins, studs, etc, either individually or in a combination thereof. In one embodiment, protrusions 210 include fins, studs or other geometric shape extending into the coolant volume 206 defined between the housing 204 and the first conduit 202 that increases the heat transfer area. Properties of each protrusion 210 may be selected independent of any other protrusions 210. For example, the dimensions of each protrusion 210, including, for example, such dimensions as depth, width, length and shape, may independently vary from embodiment to embodiment and FIG. 2 depicts the protrusion 210 as studs or fins for illustration only. The size of the protrusions 210 also may vary and can depend on its heat exchanger and intended use.

In one embodiment, the heat exchanger 214 has an operational temperature range from about ambient to 870° C. The sliding seal and the coupled protrusions 210 allow the first conduit 202 to expand longitudinally relative to the housing 204 over such operational temperatures. The heat exchanger 214 may further comprise a coolant fluid (i.e. cooling fluid) path 212 extending through the coolant volume. The coolant fluid path may be coupled to a blower 224, a source of cooling fluid 216 (such as plant air or other suitable fluid), or an eductor 218, either individually or in combination thereof. The sensor 290 may be interfaced with the coolant fluid path 212 to obtain a metric indicative of the mass of cooling fluid flowing through the heat exchanger 214 for use in the heat balance computation. Non-limiting examples of coolant fluid include but is not limited to, air, low pressure water, high pressure water, nitrogen, inert gas, heat transfer fluids such as phenoxybenzene, phenylbenzene (also known by Dowtherm™) 1,1'-Biphenyl, chloro derivatives (also known by Santotherm™,) steam.

In one embodiment, coolant fluid includes coolant fluids which minimize boiling such as high pressure water In one embodiment, the sensor 290 may provide a coolant flow rate that may be measured by such as but not limited to turbine meter, positive displacement meter, orifice meter, pitot tube, Venturi meter, magnetic flow meter, mass flow meter etc., either individually or in a combination of two or more thereof.

In one non-limiting embodiment, a plurality of material inlets 232 are respectively coupled to a plurality of units 201. In another non-limiting embodiment, the plurality of material inlets 232 are respectively coupled to a plurality of units 201 in parallel. In a particular non-limiting embodiment, at least one of the material inlets 232 is selectively coupled to a plurality of units 201.

In one non-limiting embodiment, a plurality of heat exchangers 214 may be serially coupled to a single unit 201. In one non-limiting embodiment, a plurality of heat exchangers 214 may be coupled in parallel to an outlet of a single unit 201. In another non-limiting embodiment, a plurality of heat exchangers 214 are respectively coupled to a plurality of units 201.

In another embodiment of a material withdrawal apparatus 200, a plurality of material inlets 232 are respectively coupled to a unit 201 in parallel. In another embodiment, a material inlet 232 is alternatively coupled to a plurality of units 201 by a diverter valve.

In an embodiment, the material withdrawal apparatus 200 are configured to withdraw material from one or more units 201, such as but not limited to, an FCC unit, fixed bed or moving bed unit, bubbling bed unit, units suitable for the manufacture of pyridine and its derivatives, units suitable for the manufacture of acrylonitrile, and other units suitable for industrial processes, etc., either individually or in a combination of two or more. In a particular embodiment, the material withdrawal apparatus 200 may be configured to withdraw material from a plurality of units 201 that are FCC units. In such embodiment, the material withdrawal apparatus may have an operational pressure of about 0 to about 100 pounds per square inch. The FCC unit is adapted to promote catalytic cracking of petroleum feed stock provided from a source and may be configured in a conventional manner. One example of a material withdrawal apparatus that may be adapted to benefit from the invention is described in U.S. patent application Ser. No. 11/184,125, filed Jul. 19, 2005, which is incorporated by reference in its entirety. Another example of a material withdrawal apparatus that may be adapted to benefit from the invention is described in U.S. Patent Application Ser. No. 61/026,343 filed Feb. 5, 2008, which is incorporated by reference in its entirety. In one embodiment, the material withdrawal apparatus 200 is configured to withdraw material from the plurality of units 201 through material inlet 232. In another embodiment, the material withdrawal apparatus 200 is configured to withdraw material from units designed to crack gasoline into Liquefied Petroleum Gas (LPG) such as but not limited to Superflex™ process or crack heavy feed into LPG instead of gasoline such as but not limited to Indmax™ process or. In another particular embodiment, the material withdrawal apparatus 200 may be configured to withdraw material from a unit 201 for processing acrylonitrile. The material withdrawal apparatus has at least one material inlet 232 adapted for coupling to the unit 201. An example of a unit 201 suitable for the manufacture of acrylonitrile is a fluidized bed process. Similar units are also used for manufacturing other chemicals such as pyridine.

The embodiments of the material withdrawal apparatus 200 are configured to withdraw various materials and embodiments of the invention are not limited by what material is being withdrawn or the form of the material being withdrawn. Examples of compositions of material include but are not limited to alumina, silica, zirconia, aluminosilicates, etc., either individually or in a combination of two or more compositions. Non-limiting examples of the form of material include liquid, powder, formed solid shapes such as microspheres, beads, and extrudates, either individually or in a combination of two or more forms. Non-limiting examples of materials may be referred as and include catalyst, product, powder, additive, equilibrium spent catalyst, and catalyst fines. Non-limiting examples of material withdrawal apparatus include a suitably adapted material addition vessel such as a pressurized vessel, a batching vessel for delivering as liquid, powders, and formed solid shapes such as microspheres, beads, and extrudes, either individually or in a combination of two or more.

Embodiments of the heat exchanger 214 include, but are not limited to, as described above. In one embodiment of the heat exchanger, a housing confines a coolant volume around at least a portion of the conduit; and a sliding seal 208 seals the housing to the conduit in a manner that allows the first conduit to expand longitudinally relative to the housing. Non-limiting embodiments of sliding seal are described in FIG. 3-5.

FIG. 3. includes an embodiment of the sliding seal 208. The sliding seal 208 includes a seal housing 304, a retainer 306, and a seal 308. The seal housing 204 is coupled to an end cap 204.

FIG. 4 includes another embodiment of a sliding seal 400. The sliding seal 400 couples a first portion 402 of the housing to a second portion 404 of the housing. The sliding seal 400 includes a sleeve 406, seal housing 408, a retainer 410, and a seal 412. The sleeve 406 is welded, brazed or otherwise fastened or connected in a substantially leak free manner to the first portion 402 of housing. The seal housing 408 is coupled to the sleeve. 406. The retainer 410 is threaded into the seal housing 408 to retain the seal against the first conduit 202.

FIG. 5. includes another embodiment of a sliding seal 500. The sliding seal includes one or more bellows 502. The bellows 502 couples the first portion 402 of the housing to the second portion 404 of the housing.

The material withdrawal apparatus 200 may also include a gas source 216 coupled to the first conduit 202 of the heat exchanger 214. The air or other gas source 216 may be utilized to fluidize, aerate and/or otherwise cool the withdrawn material disposed in the vessel. The material withdrawal apparatus may also include a dynamic control valve 220 to control the amount of gas delivered from the gas source into the first conduit. In one embodiment, the flow of material through heat exchanger is maintained at a rate from about 1 meter/second to about 10 meters/second. In another embodiment, the flow of material through heat exchanger is at a rate from about 1 meter/second to about 5 meters/second. In a particular embodiment, the flow of material through heat exchanger is at a rate of about 3 meters second, with a tolerance of up to about +/−30%. In another embodiment, the flow of material through heat exchanger is at a rate of about 3 meters second, with a tolerance of up to about +/−20%. In yet another embodiment, the flow of material through heat exchanger is at a rate of about 3 meters second, with a tolerance of up to about +/−10%.

Figure 6:
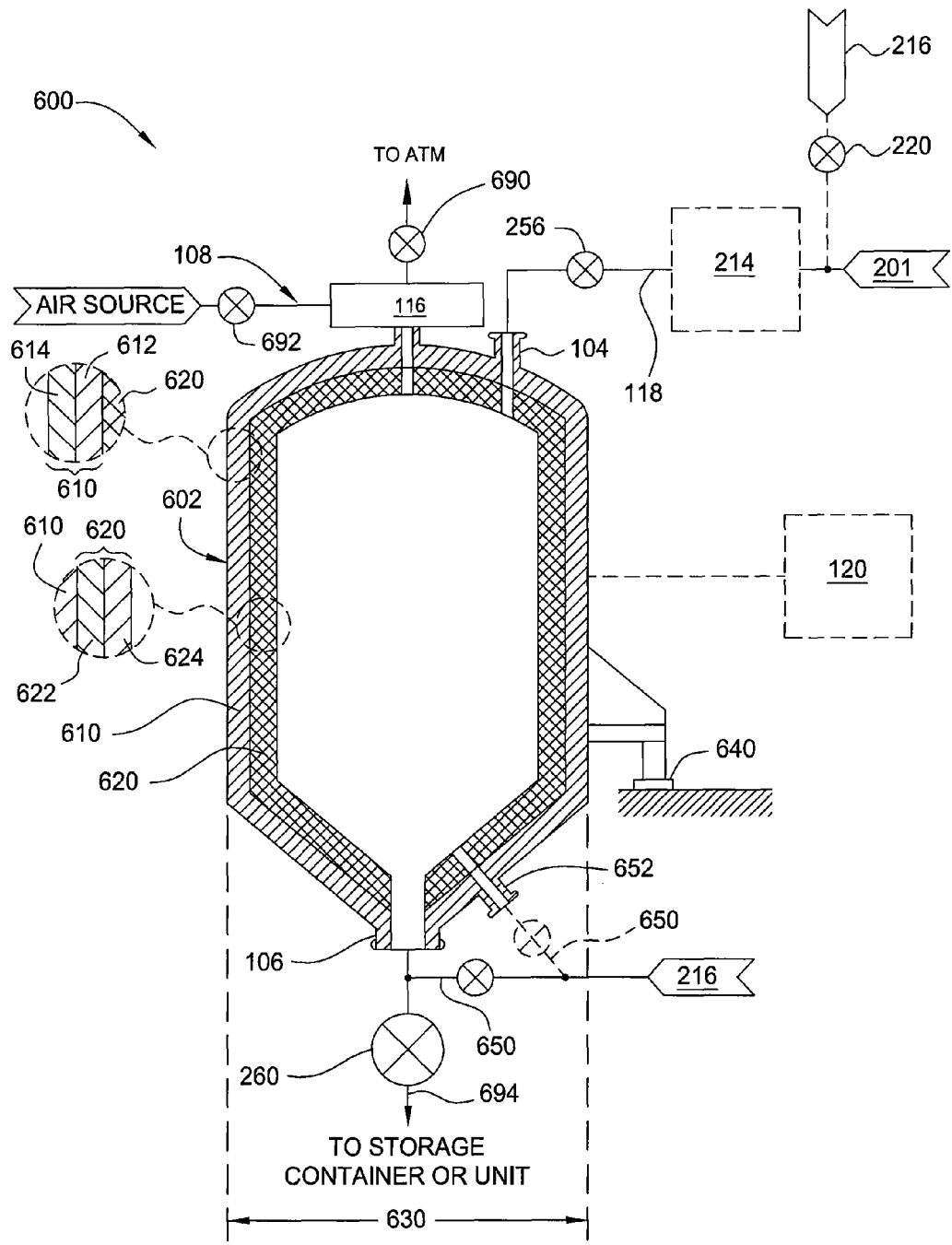
FIG. 6 is a schematic diagram of a material withdrawal apparatus with a delivery vessel in accordance with an embodiment of the present invention.

In another embodiment, as depicted in FIG. 6, a material withdrawal apparatus 600 includes a vessel 602 suitable for high temperature operation. The vessel 602 includes an outer wall 610, liner 620, fill port 104 and a discharge port 106. The liner 620 at least partially covers the inner surface of the outer wall 610. The fill port and discharge port are defined in the vessel. The fill port is configured to receive withdrawn material from one or more units 201.

Cooling fluid may be provided to the bottom of the vessel such that the cooling fluid bubbles up through and cools the material disposed in the vessel. The cooling fluid, such as air or other suitable fluid, may be distributed among the withdrawn material in the vessel 602 to cool the withdrawn material. The source of coolant may be a blower 224 or source of cooling fluid 216 (for example, a source of plant air).

In one embodiment, cooling coils to be used within the vessel to distribute the cooling fluid among the material; any of the coolant fluids mentioned above, either individually or in combination of two or more, can be used, when the one or more coolant fluids are circulated through the cooling coils. The cooling coils may by a closed loop system (e.g., a system that prevents contact between the cooling fluid and the material disposed within the vessel) or an open system (e.g., a system that allows direct contact between the material disposed within the vessel and a cooling fluid suitable for contact with the material). Non-limiting examples of coolant fluid include but is not limited to, air, low pressure water, high pressure water, nitrogen, inert gas, heat transfer fluids such as phenoxybenzene, phenylbenzene (also known by Dowtherm™) 1,1'-Biphenyl, chloro derivatives (also known by Santotherm™,) steam, etc. either individually or in combination of two or more thereof.

In one embodiment, the material withdrawal apparatus 600 further includes a metering device 256 coupled to the fill port 104 to monitor or control the amount of material received from one or more units 201. The metering device 256 may be an on/off valve such as an everlasting valve, a rotary valve or other device suitable for regulating the amount of material withdrawn from the unit 201 into the vessel 602. The metering device 256 may determine the amount of material by weight, volume, timed dispense or by other manners. The material requirements of a unit 201 may vary. In one embodiment wherein the unit 201 is an FCC unit, the metering device 256 is typically configured to remove about 0.1 to about 30 tons per day of catalyst from the regenerator 150 without interruption of processing in the FCC unit. The metering device 256 typically removes catalysts from the FCC unit periodically over the course of a planned production cycle, typically 24 hours, in multiple shots of predetermined amounts spaced over the production cycle. However, catalysts may also be removed from the FCC unit in an "as needed" basis as discussed above.

In the embodiment, the metering device 256 is a control valve that regulates the amount of material delivered from a unit 201 into the storage vessel 602 by timed actuation. The control valve may include shear disk (not shown) for opening and closing a valve orifice. In one embodiment, the shear disk rotates eccentricity while additionally rotating clear of the orifice to provide a self-lapping, seat cleaning action that prevents the withdrawn catalyst from grooving the sealing surfaces of the shear disk and valve seat that could cause the valve leakage. One valve that may be adapted to benefit from the invention is available from the Everlasting Valve Company, located in South Plainfield, N.J. Other control valves may alternatively be utilized.

The metering device 256 is opened when the vessel 602 is at a pressure less than the unit 201 to allow withdrawn material to flow into the interior of the vessel. In one embodiment, vent control valves 690, 692 may be opened to vent the vessel to atmosphere through a filter 116 while the vessel 602 is being filled through the metering device 256.

An outlet valve 260 is coupled to the discharged port 106 to control the amount of withdrawn catalyst removed from the vessel 602 to the spent catalyst storage/disposal (not shown) through an outlet line 694. In one embodiment, the outlet valve 260 is opened after the withdrawn catalyst residing in the vessel 602 has cooled to a predetermined or has resided in the vessel 602 for a predetermined period of time sufficient to allow the temperature of the withdrawn catalyst to reach a temperature suitable of handling outside of the vessel 602. The predetermined period of time may be set or adjusted by the controller 120 controlling the operation of the outlet valve 260.

In one embodiment, the control valve of the metering device 256 and the outlet valve 260 are interlocked to prevent simultaneous opening. This allows data to be obtained between valve openings such that the amount of catalyst entering and leaving the vessel 602 may be accurately resolved. In one embodiment, the outlet valve 260 is opened while a flow control circuit 108 provides air at about 60 psi (about 4.2 kg/cm$^2$) into the interior of the vessel 602 to cause catalyst to flow from the vessel 602 through the valve 260 and into the spent catalyst storage/disposal via the outlet port 106. Embodiments of the invention also include the outlet valve 260 being opened while the flow control circuit 108 provides other gas such as nitrogen or inert gas, either individually or in a combination thereof.

In one embodiment, the material withdrawal apparatus 600 further includes one or more heat exchangers 214, and one or more delivery lines 118. The delivery line 118 is coupled to the inlet 104 for delivering withdrawn material from one or more units 201 to the vessel 602.

In one embodiment, the liner 620 comprises heat insulating refractory material. Examples of heat insulating refractory material include one or more materials such as but not limited to oxides of aluminum (alumina), silicon (silica), magnesium (magnesia), calcium (lime), Zirconia, either individually or in a combination of two or more thereof. In one embodiment, the insulating refractory material comprises a thickness from about 25 mm to about 125 mm. In another embodiment, the insulating refractory material comprises a thickness from about 50 mm to about 100 mm. In yet another embodiment, the insulating refractory material comprises a thickness from about 75 mm to about 100 mm. An example of insulating refractory material is Resco Cast 17EC™. Resco Cast 17EC may have a thickness from about 50 mm to about 100 mm.

Embodiments of the invention are also not limited by what the heat insulating refractory material is and is also not limited by the amount, thickness, or form of the heat insulating refractory material. What the heat insulating refractory material is and the amount, thickness, or form of the heat insulating refractory material may readily be adjusted according to the conditions and application of the vessel 602. For example, in one embodiment, heat insulating refractory material includes capability of withstanding extremely high temperatures such as such as but not limited to oxides of aluminum (alumina), silicon (silica), magnesium (magnesia), calcium (lime), Zirconia, either individually or in a combination of two or more thereof.

In one embodiment, the liner 620 may comprise a thickness based on one or more liners. In other embodiments, the liner 620 may comprise a thickness based on two or more different types of liners such as a first outer liner 622 and a second inner liner 624. Thus, the liner 620 may comprise multilayers wherein the first and the second liner are the same or differ from each other. In one embodiment, the inner liner 624 comprises abrasion resistant material suitable for use at temperatures in excess of 600° C. An example of abrasion resistant material includes but is not limited to Resco AA 22S™. Embodiments of the invention are not limited by what the abrasion resistant material is and is also not limited by the amount, thickness, or form of the abrasion resistant material. In a particular embodiment, liner 620 comprises a first inner liner 624 comprising a thin layer of abrasion resistant material suitable for use at temperatures in excess of 600° C. and second outer liner 622 comprising a thicker layer of heat insulating refractory material.

In one embodiment, the outer wall 610 includes one or more materials such as but not limited to carbon steel. The outer wall 610 may be a carbon steel in the form of a jacket around the liner 620. In one embodiment, the outer wall 610 has a metallic surface. The outer wall 610 may include one or more metals, such as but not limited to, Au, Ag, Cu, Ni, Pd, Pt, Al, and Cr, either individually or through any combination thereof. In another embodiment, the outer wall 610 may include iron, nickel, cobalt, manganese, tin, vanadium, nickel, titanium, chromium, manganese, cobalt, germanium, bismuth, molybdenum, antimony, and vanadium, either individually or in a combination of two or more thereof.

In one embodiment, the outer wall 610 comprises a thickness from about 25 mm to about 50 mm. In another embodiment, the outer wall 610 comprises a thickness from about 9 mm to about 50 mm. In yet another embodiment, the outer wall 610 comprises a thickness from about 9 mm to about 16 mm. In one embodiment, the outer wall 610 may comprise a thickness based on multiple layers, which are the same or differ from each other.

Embodiments of the invention are not limited by what the outer wall 610 is and is also not limited by the amount, thickness, or form of the outer wall. What the outer wall 610 is and the amount, thickness, or form of the outer wall 610 may readily be adjusted according to the conditions and application of the vessel 602. For example, in one embodiment, the outer wall 610 is capable of withstanding extremely high temperatures and the outer wall 610 thicknesses may be varied based on vessel diameter 630 and design pressures of the vessel 602 as shown in table 1:

TABLE 1

| Diameter | 3.5 kg/cm2 Elliptical Head | 3.5 kg/cm2 Shell | 8.6 kg/cm2 Elliptical Head | 8.6 kg/cm2 Shell |
| --- | --- | --- | --- | --- |
| 1 m | 9 mm | 9 mm | 9 mm | 9 mm |
| 2 m | 12 mm | 12 mm | 12 mm | 12 mm |
| 3 m | 16 mm | 16 mm | 16 mm | 16 mm |

The liner 620 may comprise a thickness based on one type of lining in one embodiment. In other embodiments, liner 620 may comprise a thickness based on two or more different types of linings, such as a first liner 622 and a second liner 624. Thus, the liner 620 may comprise multilayer coatings wherein the first and the second liners are the same or differ from each other.

In one embodiment, the material withdrawal apparatus 600 further includes a control valve 220 configured to control the amount of gas to the delivery line 118 and entrained with the material. In a particular embodiment, the material withdrawal apparatus 600 optionally includes one or more heat exchanger 214 and or one or more flow control circuits 108 coupled to the vessel.

In one embodiment, material withdrawal apparatus 600 further includes a flow control circuit 108 configured to dynamically regulate backpressure within the vessel 602 to control the flow of material into the vessel 602 from the unit 201. Advantages of positioning of the flow control circuit 108 downstream of the vessel 602 may include, but is not restricted to, preventing abrasive material contacting with the flow control circuit 108, and preventing dust emissions to atmosphere. For example, the flow control circuit 108 may increase the pressure within the vessel 602 such that the rate of material entering the vessel through the fill port 104 is slowed. Conversely, the flow control circuit 108 may reduce the pressure within the vessel to allow more material to flow into the vessel 602 through the fill port 104. When flow control circuit 108 used in conjunction with a heat exchanger 214 coupled to the fill port 104, the amount of cooling of the material passing through the heat exchanger 214 into the vessel 602 may be controlled and additionally, the rate of material flowing through the conduit 118 may be controlled to prevent settling of material in the conduit 118 and clogging. Additionally, the flow control circuit 108 may be coupled to a controller 120, such that the pressure of the vessel 602 is dynamically regulated in response to at least one of the amount of material in the vessel 602, the rate of material passing through the heat exchanger 214 and the temperature of the material exiting the heat exchanger 214.

In one embodiment, the vessel 602 is suitable for high temperature operation. In a particular embodiment, the vessel 602 is suitable for receiving catalyst at a temperature in excess of about 600° C. In another embodiment, the vessel 602 is suitable for receiving material at a temperature in a range from about 600° C. to about 850° C. In yet another embodiment, the vessel 602 is suitable for receiving material at a temperature in excess of about 800° C. In yet another embodiment, the vessel 602 is suitable for receiving material at a temperature in a range from about 600° C. to about 850° C. In yet another embodiment, the vessel 602 is suitable for receiving material at a temperature in excess of about 800° C. In yet another embodiment, the vessel 602 comprises a pressure vessel. For example, the pressure vessel is pressurizable from about 5 to about 60 pounds per square inch (about 0.35 to about 4.2 $kg/cm^2$) during withdrawal operations. Intermittently, the vessel 602 may be vented to about atmospheric pressure.

In one embodiment, the unit 201 comprises fluid catalyst cracking unit (FCCU). It should be appreciated that the material withdrawal apparatus 200 and method may apply to other fluidized bed systems as well, such as but not limited to, fluidized bed combustors in the power industry and fluidized bed system with lower temperature applications. It should be appreciated that the material withdrawal apparatus 200 may remove material from one or more of such units 201, simultaneously or sequentially. In one embodiment, the material withdrawal apparatus 600 may remove material from a plurality of units 201, wherein the units may be the same or differ from each other. In an embodiment, venting occurs in multiple stages.

In one embodiment, the material withdrawal apparatus may include one or more filters 116 disposed between the vessel 602 and the flow control circuit 108. An advantage may be the filter prevents abrasive materials such as catalyst from reaching the flow control circuit. Non-limiting examples of filters include ceramic, hastelloy, titanium, or other sintered metal material, either individually or through any combination thereof.

Filter 116 may be a woven metal mesh. In one embodiment, the metal filter has a metallic surface. The metal filter 116 may include one or more metals, such as but not limited to, Au, Ag, Cu, Ni, Pd, Pt, Al, and Cr, either individually or through any combination thereof. In another embodiment, the metal filter metal filter 116 may include titanium, austenitic nickel-based superalloys such as INCONEL™, ceramic, iron, nickel, cobalt, manganese, tin, vanadium, nickel, titanium, chromium, manganese, cobalt, germanium, bismuth, molybdenum, antimony, and vanadium, either individually or in a combination of two or more thereof. In one embodiment, benefits of using a filter may include but is not limited to keeping or minimizing potentially toxic dust out of the atmosphere.

In a particular embodiment, the filter 116 comprises stainless steel. In a particular embodiment, the metal filter comprises a woven stainless steel mesh filter. It should be appreciated that the filter 116 may include any other inorganic or organic material provided the filter includes a sufficient amount of metal or ceramic to provide heat resistance. In one embodiment, the filter 116 comprises a sufficient amount of metal or ceramic Save to withstand heat from the withdrawn catalyst. In one embodiment, the filter 116 is suitable for receiving catalyst at a temperature in excess of about 600° C. In yet another embodiment, the filter 116 is suitable for receiving catalyst at a temperature in a range from about 600° C. to about 850° C. In yet another embodiment, the filter 116 is suitable for receiving catalyst at a temperature in excess of about 800° C. In another embodiment, the filter 116 has an operational temperature at a range from about ambient to 760° C.

The shape and size of the filter 116 may vary. For example, the filter 116 may be in the shape of a tubular and or pleated or any non-spherical object.

The size of the filter 116 also may vary and can depend on its composition and intended use. In one embodiment, air flow may be reversed to clean the filter 116 such that any trapped particulate in the filter remains in the vessel 602.

In one embodiment, the material withdrawal apparatus 600 includes one or more sensors coupled to the vessel and configured to provide a metric indicative of material entering the vessel through a metering device. Non-limiting examples of sensors, for illustration and not limitation, include a load cell, a differential pressure sensor, flow sensor, and a level sensor, either individually or in a combination thereof. The material withdrawal apparatus may be equipped with one or more sensors that provide a metric indicative of a material level within a unit, such as the regenerator of an FCCU. In one embodiment, the unit includes a first sensor and a second sensor configured to detect when the level of material within the regenerator exceeds an upper or lower threshold. The sensor may be a differential pressure measurement device, optical transducer, a capacitance device, a sonic transducer or other device suitable for providing information from which the level or volume of material disposed in the regenerator may be resolved. For example, if the first sensor provides an indication to a controller that the material level is low, the controller may initiate material injection by the material injection system. Conversely, if the second sensor provides an indication to the controller that the material level is high, the controller may initiate a material withdrawal from the unit 201 by the material withdrawal apparatus 600, or speed up these otherwise semi-continuous withdrawal processes.

In one embodiment, the material withdrawal apparatus 600 includes one or more sensors 640 for providing a metric suitable for resolving the amount of material passing through a metering device during each withdrawal of material from unit 201, such as an FCCU unit. The sensor or plurality of sensors may be configured to detect the level (i.e., volume) of material, the weight of material, and/or the rate of material movement through at least one of the vessel, in let, outlet, regenerator, or the metering device. Non-limiting examples of sensors include load cell, a differential pressure sensor, flow sensor, and a level sensor, either individually or in a combination thereof.

In the embodiment, the sensor 640 includes a plurality of load cells adapted to provide a metric indicative of the weight of material in a vessel 602. The load cells are respectively coupled to a plurality of legs that supports the vessel above a surface such as a concrete pad. Each of the legs has one load cell coupled thereto. Only one leg and load cell is shown in FIG. 6 for the sake of clarity. The controller receives the outputs of the load cell and utilizes sequential data samples obtained therefrom to resolve the net amount of withdrawn material after each actuation of the metering device. Data samples are also taken after actuation of the outlet valve such that the true amount of material withdrawn from the unit 201 via the material withdrawal apparatus 600 may be accurately determined. Additionally, the net amount of material withdrawn over the course of the production cycle may be monitored so that variations in the amount of material dispensed in each individual shot may be compensated for by adjusting the withdrawal attributes of the metering device, for example, changing the open time of the flow control circuit 108 to allow more (or less) material to pass therethrough and be removed from the unit 201.

Alternatively, the sensor 640 may be a level sensor coupled to the vessel and adapted to detect a metric indicative of the level of material within the vessel 602. The level sensor may be a differential pressure measuring device, an optical transducer, a capacitance device, a sonic transducer or other device suitable for providing information from which the level or volume of material disposed in the vessel my be resolved. By utilizing the sensed difference in the level of material disposed in the vessel after dispenses, the amount of material removed from the regenerator may be resolved for a known vessel geometry.

Alternatively, the sensor 640 may be a flow sensor adapted to detect the flow of material through one of the components of the material withdrawal apparatus 600. The flow sensor may be a contact or non-contact device and may be mounted to the vessel, the metering device or the conduit coupling the vessel to a waste container. In the embodiment, the flow sensor may be a sonic flow meter or capacitance device adapted to detect the rate of entrained particles (i.e., catalyst) moving through the delivery line.

Another embodiment of the material withdrawal apparatus includes one or more heat exchangers 214 coupled to the vessel 602. In a particular embodiment, the material withdrawal apparatus 200 optionally includes one or more control valves 220 and one or more flow control circuits 108 coupled to the vessel 602.

Figure 7:
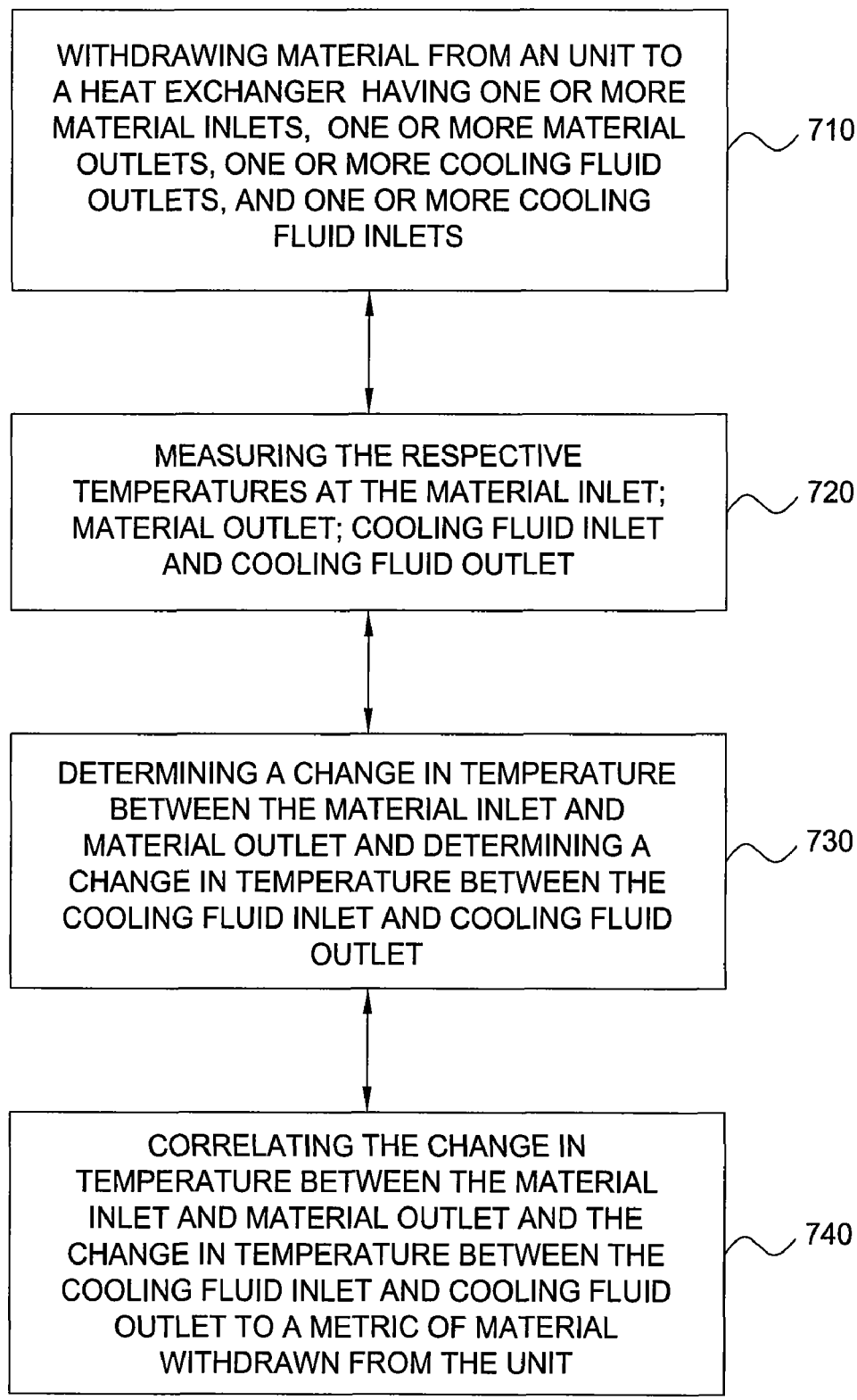
FIG. 7 is a flow diagram of a method of regulating material in at least one unit in accordance with an embodiment of the present invention.

With reference to FIG. 7, next is depicted a method of withdrawing one or more materials from one or more units 201. The method includes a step 710 of withdrawing material from a unit to a heat exchanger 214 coupled to the unit 201. The heat exchanger 214 includes one or more material inlets 232, one or more material outlets 234, one or more cooling fluid outlets 236, and one or more cooling fluid inlets 238.

The method also includes a step 720 of measuring the respective temperatures at the material inlet; material outlet; cooling fluid inlet and cooling fluid outlet of the heat exchanger 214. The step 720 of measuring the temperature may be performed by temperature sensors 280, 282, 284, and 286 such as but not limited to thermocouples, Pt Resistance Thermometers, and IR cameras.

Step 730 includes determining a change in temperature between the material inlet and material outlet and determining a change in temperature between the cooling fluid inlet and cooling fluid outlet.

Step 740 includes correlating the change in temperature between the material inlet and material outlet and the change in temperature between the cooling fluid inlet and cooling fluid outlet to a metric of material withdrawn from the unit 201 as discussed above. Information obtained from the sensor 290 is used during the correlation to provide a metric indicative of the amount of cooling fluid passing through the heat exchange. Thus, Step 740 includes determining a metric of the amount of material being withdrawn from the unit 201. In an embodiment, the method further includes a vessel coupled downstream to the material outlet of the heat exchanger. In a particular embodiment, the vessel comprises heat insulating refractory material.

Figure 8:
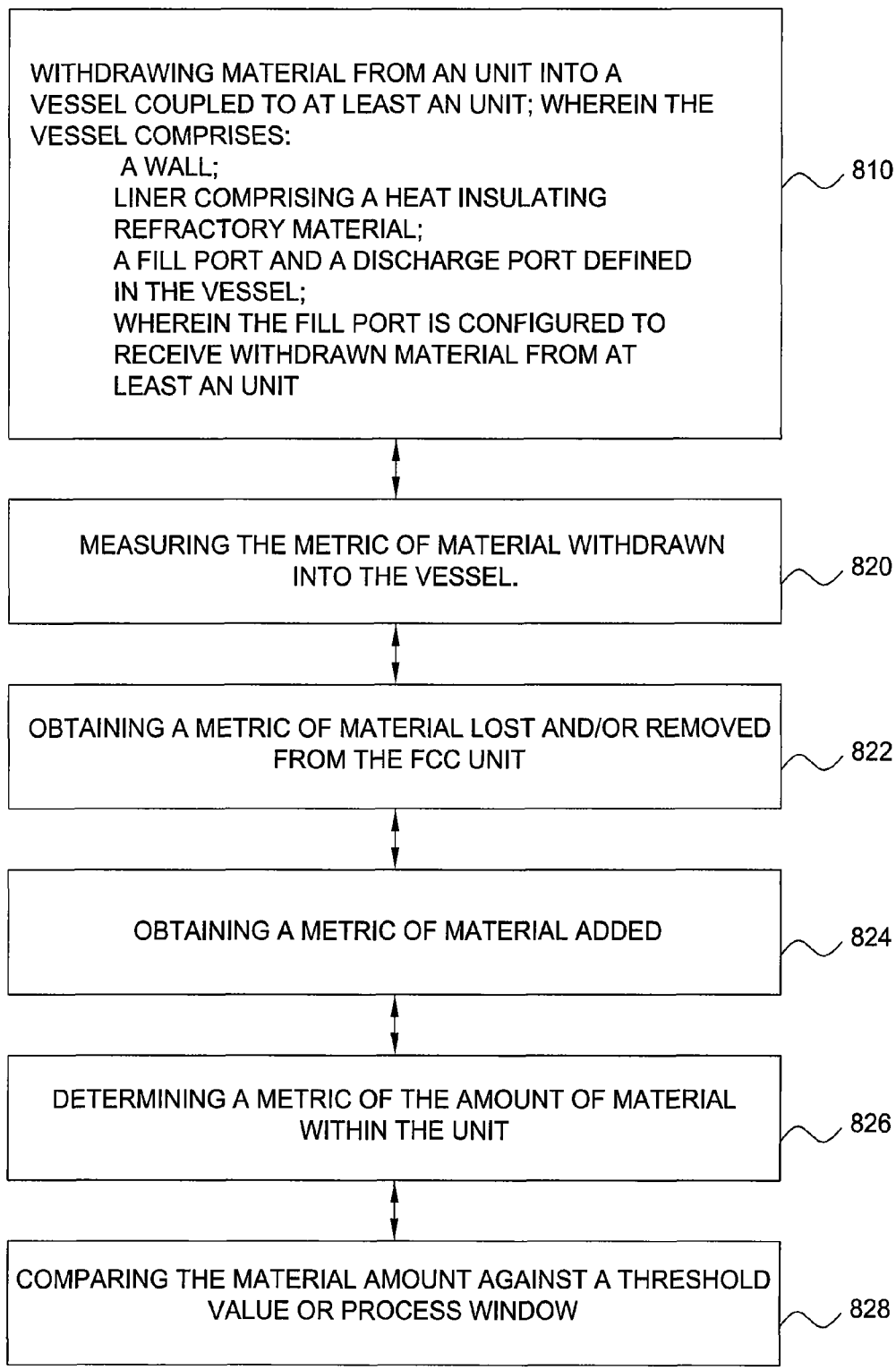
FIG. 8 is a flow diagram of another method of regulating material in at least one unit in accordance with an embodiment of the present invention To facilitate understanding, identical reference numerals have been used, where possible, to designate identical elements that are common to the figures, except that suffixes may be added, when appropriate, to differentiate such elements. The images in the drawings are simplified for illustrative purposes and are not depicted to scale. It is contemplated that features or steps of one embodiment may be beneficially incorporated in other embodiments without further recitation.

With reference to FIG. 8, next is depicted another method of withdrawing one or more materials from one or more units 201. The method includes a step 810 of withdrawing material from a unit into vessel coupled to at least a unit. The vessel 602 includes an outer wall 610, liner 620, fill port 104 and a discharge port 106. The liner comprises a heat insulating refractory material and the fill port is configured to receive withdrawn material from at least a unit.

The method also includes a step 820 measuring the metric of material withdrawn into the vessel. Step 820 of measuring the metric of material withdrawn into the vessel may be performed by a metering device to 256. In the embodiment, one or more sensors 640 are coupled to the vessel 602 and configured to provide the metric indicative of material entering the vessel 602 via a metering device. Non-limiting examples of sensors, for illustration and not limitation, include a load cell, a differential pressure sensor, flow sensor, and a level sensor, either individually or in a combination thereof.

Optionally, in an embodiment, the step 820 of metering may be executed by a step 822 of obtaining a metric of material lost and/or removed from the unit 201. The metric of material lost may be a predefined value. For example, based on empirical data, or calculated data, or maybe a provided real time and/or as an updated metric. Examples of updated and/or provided metrics include a metric of material entrained in the product stream, material exiting the regenerator through the exhaust system, material removed from the metered withdrawal system, among others.

At step 824, a metric of material added is obtained. The metric of material addition are typically attained from the material addition system, in the form of catalyst and/or additives added to the unit.

At step 826, a metric of the amount of material within the unit is determined. In one embodiment, the amount of material is determined by summing the material additions of 824 minus the material removed from the system obtained at step 822. The determination of material within the unit may be made from data obtained over a predetermined period of time. The predetermined period of time may be in fractions of an hour, hourly, daily or over other time periods. The determination of material within the unit 201 may be made from data obtained real time, for example, by monitoring a data stream such as regenerator bed level. As the process described above is iterative, the total material determined may, alternatively, be calculated by subtracting the material removed over the period from the last determination and adding the material added over the same period.

Optionally, at step 828, the material amount is compared against a threshold value or process window. If the determined material is outside of a predefined process window (or exceeds the threshold), appropriate material additions or withdrawals are made at step 810. This cycle of monitoring the amount of material is repeated in order to maintain the dynamic material equilibrium in the unit. Advantageously, this allows the unit to continue operating at or near processing limits with minimal fluctuation, thereby providing the desired product mix and emissions composition with minimal disoptimisation, thereby maximizing the profitability of the FCC system refiner.

Optionally, a controller 120 is provided to control the function of at least the material withdrawal apparatus. The controller 120 generally includes a processor, support circuits and memory. The controller 120 may be any suitable logic device for controlling the operation of the material withdrawal apparatus 600. In one embodiment, the controller 120 is a programmable logic controller (PLC), such as those available from GE Fanuc. However, from the disclosure herein, those skilled in the art will realize that other controllers such as microcontrollers, microprocessors, programmable gate arrays, and application specific integrated circuits (ASICs) may be used to perform the controlling functions of the controller 120.

The controller 120 is coupled to various support circuits that provide various signals to the controller 120. These support circuits include, power supplies, clocks, input and output interface circuits and the like. Other support circuits couple to the flow control circuit 108, the control valve 220, and the like, to the controller 120. In one embodiment, the controller 120 controls the actuation of the control valve 220 such that the flow through the delivery line 118 and/or first conduit 202 of the heat exchanger 214 is maintained a rate that provides good heat transfer and substantially prevents the material from settling out of the flow with in the line 118 and/or conduit 202, while minimizing the abrasive, sandblasting effect, of the entrained material, such as the rates described above. In another embodiment, the controller 120 controls the actuation of one or more valves comprising the fluid control circuit 108 such that backpressure with in the vessel 602 may be regulated in a manner that controls the flow of material within the delivery line 118 from the unit 201 and into the vessel 602.

In another embodiment of a method for regulating material within a unit, the material withdrawal apparatus may be set to remove a predefined amount of material over a predefined period of time. For example, the material withdrawal apparatus 200 may be set to remove a target withdrawal of about 4 tons of material per day. The withdrawal may be made in predetermined increments, such that a total withdrawal amount will be made over the predefined period. In one embodiment the operator may manually initiate withdrawals from the regenerator using the system. For example, the operator may initiate a withdrawal in response to the material bed level within the regenerator, such as provided by information obtained by the sensor. The manual withdrawal may be made in addition to the target withdrawal, or count against the target withdrawal for that time period.

In an embodiment, the methods further includes withdrawing material from a unit by heat exchanging with one or more heat exchangers 214, regulating back pressure with one or more flow control circuits 108, and regulating amount of gas flow with one or more control valves 220 configured to control the amount of gas to the delivery line 118 and entrained with the material, either individually or in a combination thereof. In a particular embodiment, the method further includes heat exchanging with one or more heat exchangers 214 as described above. In one embodiment, the method includes dynamically regulating backpressure within the vessel with one or more flow control circuits 108. In one embodiment, the method includes regulating amount of gas flow with a control valve 220 configured to control the amount of gas to the delivery line and entrained with the material. In one embodiment, the method includes withdrawing the material from the vessel and or recycling or re-adding the withdrawn material to the unit.

The described methods are not limited by a sequence of when and how heat exchanging with a heat exchanger, regulating back pressure with a flow control circuit, withdrawing to a vessel, regulating amount of gas with a control valve. Heat exchanging with a heat exchanger, regulating back pressure with a flow control circuit, and regulating amount of gas with a control valve may occur either sequentially or simultaneously. In one embodiment, heat exchanging with a heat exchanger occurs before, during or after optionally regulating back pressure with a flow control circuit, and regulating amount of gas with a control valve. In another embodiment, regulating back pressure with a flow control circuit occurs before, during or after optionally heat exchanging with a heat exchanger and regulating amount of gas with a control valve. In another embodiment, regulating amount of gas with a control valve occurs before, during or after optionally heat exchanging with a heat exchanger or regulating back pressure with a flow control circuit.

The method is also not limited by the frequency of heat exchanging with a heat exchanger, regulating back pressure with a flow control circuit, and regulating amount of gas with a control valve. The method is also not limited by the form of the heat exchanger, flow control circuit, control valve. Examples of the form of heat exchanger, flow control circuit, control valve include, but are not limited to, are described above.

The following examples are for illustration and not limitation.

When the weight measuring pressure vessel is bypassed, the mass of the catalyst cooled and transferred to the spent catalyst hopper will be calculated by a heat balance around the heat exchanger system by the use of the following equation:

Mass of cooling fluid×Specific Heat of cooling fluid× (temperature of cooling fluid at cooling fluid outlet−temperature of cooling fluid at cooling fluid inlet)=Mass of material×Specific heat of material×(temperature of material at material inlet−temperature of material at material inlet)

Mass of material=(Mass of cooling fluid×Specific Heat of cooling fluid×(temperature of cooling fluid at cooling fluid outlet−temperature of cooling fluid at cooling fluid inlet))/(Specific heat of material×(temperature of material at material inlet−temperature of material at material inlet))

Example Calculation:

Mass of Catalyst kg/min=(117.1 kg air per min.×1.0 kJ/kg·DegC×(130.2 C−37.8 C))/(1.13 kJ/kg·DegC×(732.2 C−426.7 C)=31.5 kg catalyst per min It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

While the invention has been described in detail in connection with only a limited number of aspects, it should be understood that the invention is not limited to such disclosed aspects. Rather, the invention can be modified to incorporate any number of variations, alterations, substitutions or equivalent arrangements not heretofore described, but which are commensurate with the scope of the claims. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
    withdrawing material from a fluid catalytic cracking unit to a heat exchanger coupled to the fluid catalytic cracking unit; wherein the heat exchanger has a material inlet; a material outlet; a cooling fluid inlet and a cooling fluid outlet with respective temperatures;
    measuring the respective temperatures at the material inlet; material outlet; cooling fluid inlet and cooling fluid outlet of the heat exchanger;
    determining a change in temperature between the material inlet and material outlet and determining a change in temperature between the cooling fluid inlet and cooling fluid outlet; and
    correlating the change in temperature between the material inlet and material outlet and the change in temperature between the cooling fluid inlet and cooling fluid outlet to a metric of material withdrawn from the unit.

2. The method of claim 1, wherein correlating the change in temperature between the material inlet and material outlet and the change in temperature between the cooling fluid inlet and cooling fluid outlet to a metric of material withdrawn from the unit comprises correlating to a metric of the mass of material withdrawn from the unit.

3. The method of claim 2, wherein correlating the mass of material withdrawn from the unit comprises:
    (Mass of cooling fluid×Specific Heat of cooling fluid× (change in temperature between the cooling fluid inlet and cooling fluid outlet to a metric of material withdraw))/(Specific heat of material×(the change in temperature between the material inlet and material outlet)).

4. A method comprising:
    withdrawing material from a unit into a vessel coupled to at least a fluid catalytic cracking unit; wherein the vessel comprises:
        an outer wall;
        liner at least partially covering the inner surface of the outer wall,
        wherein the liner comprising a heat insulating refractory material;
        a fill port and a discharge port defined in the vessel;
            wherein the fill port is configured to receive withdrawn material from at least a unit; and
    measuring a metric of material withdrawn into the vessel.

5. The method of claim 4 wherein measuring further comprises:
    sensing a metric of material disposed in the vessel.

6. The method of claim to 5, wherein sensing further comprises:
    determining a change in weight of the vessel.

7. The method of claim 4, wherein withdrawing the material further comprises:
    venting the vessel.

8. The method of claim to 4, further comprising removing the measured metric of material from the vessel.

* * * * *